United States Patent [19]
Grier

[11] 3,741,606
[45] June 26, 1973

[54] CAMPING TRAILER
[76] Inventor: John P. Grier, P.O. Box 505, Melbourne Beach, Fla. 32951
[22] Filed: July 19, 1971
[21] Appl. No.: 151,230

[52] U.S. Cl. ................................. 296/22, 296/24 A
[51] Int. Cl. ............................................. B60p 3/02
[58] Field of Search .................. 296/22, 23 A, 57, 296/23 R, 24 R

[56] References Cited
UNITED STATES PATENTS
2,181,342   11/1939   Reid .................................. 296/57 R
FOREIGN PATENTS OR APPLICATIONS
1,014,110   5/1952   France ................................. 296/22

Primary Examiner—Philip Goodman
Attorney—Alfred E. Wilson

[57] ABSTRACT

A picnicking and camping trailer adapted to be towed behind a vehicle such as a passenger automobile, pick-up truck or other vehicle. The picnic and camping trailer has a closed compartmentized body box having a plurality of separate compartments of varying sizes adapted to receive the various articles required for picnicking, camping or other recreational expeditions, such for example as a tent, bedrolls, cooking utensils, cold and normal temperature foods storage compartments, eating equipment, fishing and other sporting equipment, and all of the miscellaneous items or gear that are required. The compartmentized body box has separate compartments of approximate sizes to separate the wet from the dry articles, and the rough articles such as tents from the food, cooking utensils etc.

The upper side, and preferably the back walls also of the camping and picnicking trailer are hinged along their bottom edges along horizontal axes to fold out and provide tables positioned at approximately 26 inches to 30 inches above ground level for the preparation and serving of food and for other purposes.

The lower side walls beneath the table forming walls are hingedly mounted on laterally movable guides extending transversely of the camping trailer, and are movable outwardly and may be turned from vertical positions closing the lower side openings of the camping and picnicking trailer to horizontal positions spaced laterally beyond the outer edges of the upper side walls when in the horizontal table forming position to provide benches approximately 16 inches to 18 inches above ground level and extending along the sides of the table and positioned at comfortable distances beyond the outer edges of the tables when in the horizontal positions to facilitate eating at the tables.

The bench forming members can be moved to the inner or travelling position and the upper table forming side walls can be hinged downwardly to the vertical position to permit ready access to the sides of the trailer to facilitate loading or unloading of the individual compartments of the body box.

The space on top of the camping trailer may be flat and may be used for many purposes such as sleeping, carrying of articles which for any reason cannot conveniently be positioned in any of the compartments, such for example as dead animals resulting from a hunt.

9 Claims, 8 Drawing Figures

PATENTED JUN 26 1973

INVENTOR.
JOHN P. GRIER
BY
Alfred J. Wilson
ATTORNEY.

INVENTOR.
JOHN P. GRIER
BY Alfred S. Wilson
ATTORNEY.

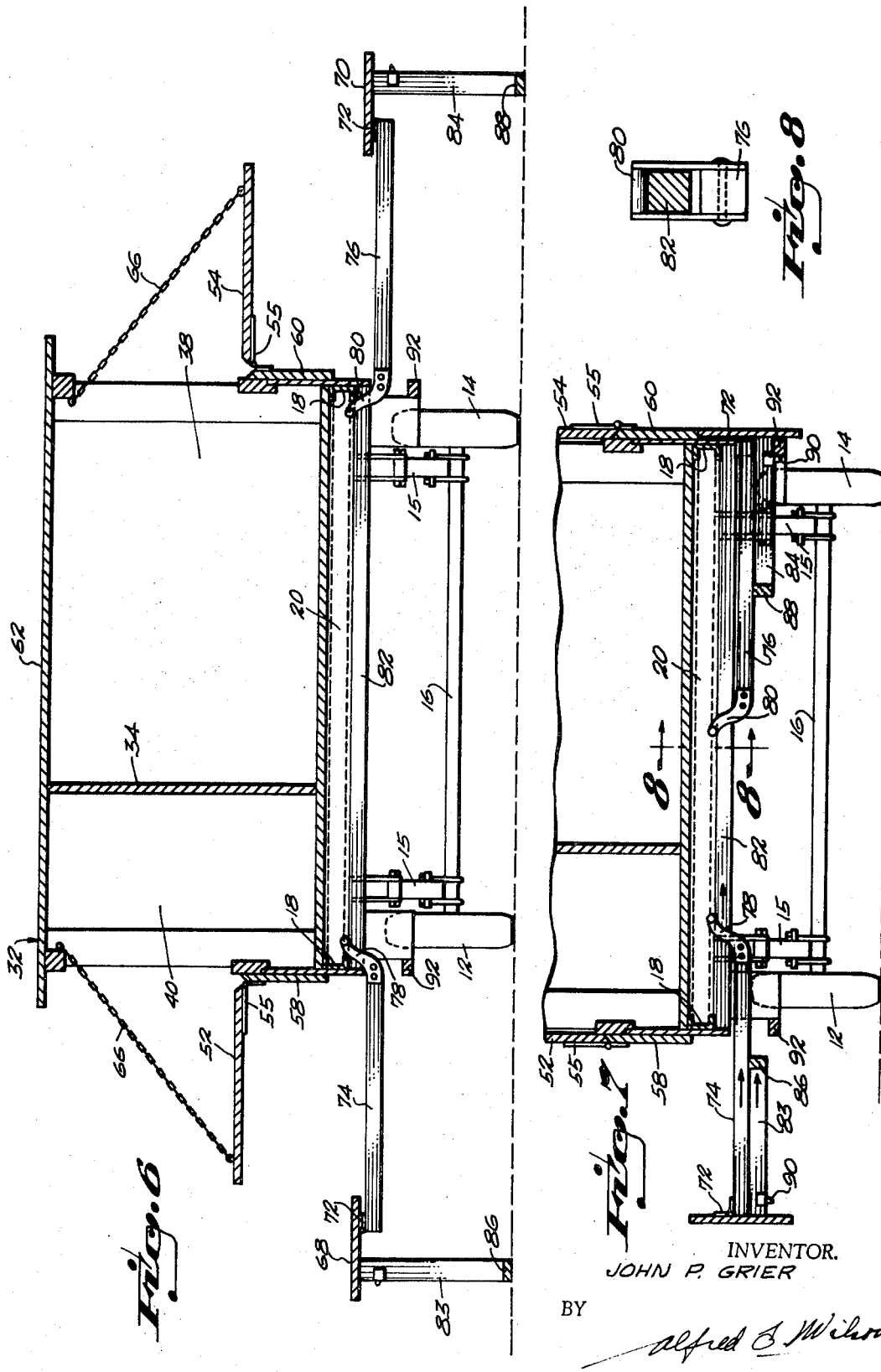

CAMPING TRAILER

This invention relates to a picnic and camping trailer having a compartmentized body box having upper and lower side closure members proportioned to provide table and bench members located at suitable vertical heights. When in use the table and bench members are positioned at proper lateral spacings to provide convenient accomodations of appropriate horizontal widths and heights to permit persons to be comfortably seated thereon to partake of food served on the table, and for other purposes.

I have found that none of the commercially available camping trailers including the illustrated designs thereof with which I am familiar provide the basic essentials requisite to make picnicking and camping easy and enjoyable. Virtually all of these prior devices merely provide a large container space into which all of the paraphernalia required in camping and picnicking can be dumped. At the destination or when desiring to enjoy a picnic lunch this process is reversed, and virtually everything must be unloaded and sorted to permit serving food or setting up camp for an overnight stay.

My improved picnicking and camping trailer has a body box including vertically spaced horizontal floor and roof members and a plurality of vertical and horizontal partitions dividing the space within the body box into a plurality of compartments of varying sizes. These individual compartments are of suitable sizes and conveniently located to permit the separation of classes of materials required for picnicking or camping or other recreational purposes. For example food-stuffs can be separated from non-food materials, cold food areas can be separated from normal temperature areas; wet things as swim suits, tents etc can be separated from dry materials; rough things such as tents, bed-rolls etc can be separated and compartmentized from food-stuffs, sporting and game equipment, medicine and first aid equipment etc. The individual compartments make it possible to readily locate particular items without the necessity of unloading and sorting items not required at a particular time.

In any picnicking, camping or similar trip it is important to have a suitable place available to prepare food, and a place to serve it where the participants can be seated comfortably at a table of appropriate height and width without having to resort to other equipment such as a picnic table.

An object of my invention is therefore to provide a picnicking and camping trailer having a compartmentized body box adapted to be closed by suitable side closure members proportioned to provide readily accessable cooperating table and bench members.

Another object of my invention is to provide a picnicking and camping trailer having a plurality of separate compartments of suitable size and proportions to permit the ready separation of various classes of materials used in such expeditions, such as to separate rough and large articles, for example tents, bedrolls etc from food-stuffs, and to separate cold food articles from normal temperature food stuffs.

Still a further object is to provide a picnicking and camping trailer having a plurality of side opening compartments of different sizes for the reception of different classes of articles so that necessary articles can be readily segregated and available for use without disturbing other compartmented articles, and wherein the side opening compartments may be closed by a panel hinged at the bottom and adapted to be hinged down to a horizontal table forming position.

A further object of my invention resides in the provision of a camping trailer having a vertical height to permit the upper side closures for spaced compartments to be closed by a hinged upper panel adapted when folded down to a horizontal position to form a table of conventional height, and when folded down further to a vertical position to uncover the individual compartments of the body box and to permit ready access to the side compartments of the trailer for loading or unloading the compartments, and wherein laterally shiftable lower slides are adapted in an extended position to form benches appropriately positioned relative to the table.

Another object of my invention is to provide a lightweight camping trailer having a compartmentized box body for the reception of the various articles required on a picnicking or camping expedition, and wherein the upper side and rear panels are hingedly mounted to provide selectively useable tables for the preparation and serving of food, and wherein laterally shiftable lower panels provide benches appropriately positioned with respect to the tables to permit the participants to comfortably sit at the tables.

Still a further object of my invention is to provide a camping trailer having a compartmentized body box having divided upper and lower side panels proportioned in relation to the dimensions of the human body to provide tables and benches of convenient heights and lateral spacings to permit the preparation and serving of food and where individuals may comfortably sit at the tables to eat.

Other object and advantages of my invention will be apparent from the following detailed description of an illustrative embodiment thereof, reference being had to the accompanying drawings wherein similar reference characters refer to similar parts throughout the several views.

In the drawings:

FIG. 6 is a rear elevational view, partly in section, of the picnicking and camping trailer in the fully extended position with the table and benches in the operative positions.

FIG. 7 is a view similar to FIG. 6 with the side panels closed and the benches on the left side in the partially retracted position.

FIG. 8 is a fragmentary sectional view taken substantially on the line 8—8 of FIG. 7, looking in the direction of the arrows.

Figure 1:
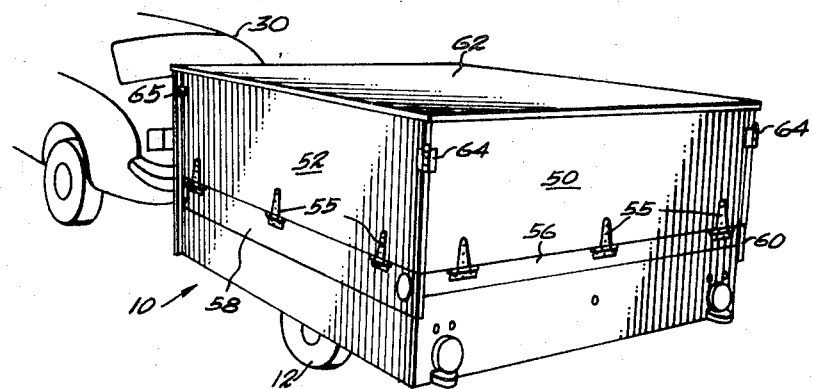
FIG. 1 is a perspective view of my improved picnicking and camping trailer shown in assembled relation with an automobile.

Referring now more particularly to the drawings my invention is illustrated as applied to a picnicking and camping trailer 10 having road engaging wheels 12 and 14 mounted on suitable wheel support means such as an axle 16 mounted on resilient support means such as leaf springs 15 extending longitudinally of the camping trailer 10, and supported by a chassis having a suitable frame members 18 and 20. It will of course be apparent that any suitable wheel support means may be employed such for example as independent suspension for each of the wheels 12 and 14, or if desired my improved picnicking and camping trailer may be suitably mounted on the trailer 10 depending on the size and weight of the unit.

Any suitable type of hitch may be employed to releasably secure the trailer to a motor vehicle, such for example as the drawbar 22 and the angled brace members 24 and 26 suitably secured to the framework of the chassis and having a suitable socket connection 28 adapted to engage the usual ball support mounted on the vehicle 30.

Essentially my invention consists of a plurality of compartments of varying sizes to permit the segregation of various classes of equipment and paraphernalia required for a successful picnicking or camping trip. For example the articles which in use become wet are segregated from the dry articles, also separate appropriately dimensioned compartments are available for the storage of food stuffs, provision being made for separating food which should be preserved in a cold state from that which may be kept at room temperature. Also one or more separate compartments may be allocated for the storage of cooking utensils. Preferably this may be near the back of the enclosure 32.

My improved camping trailer consists of a rectangular enclosure 32 secured to the frame members 18 and 20 of the chassis, and having suitable vertical and horizontally extending members 34 and 36 dividing the space within the enclosure 32 into a plurality of compartments of appropriate size for the reception of the various items or gear required for picnicking or camping. This may include for example a large compartment 38 for the reception of rough materials such as a tent, and smaller compartments such as 40, 42, 44 and 46 for the reception of smaller items such as bed rolls and mosquito repellant, cooking utensils, cold and normal temperature food storage compartments, or an ice chest, stove and all of the other equipment and paraphernalia normally required to support a leisurely and relaxing picnicking or camping trip.

My improved camper trailer has readily accessable table and bench members to facilitate the preparation, serving and eating of food without the necessity of unpacking or unloading any of the gear or equipment required for other purposes.

For example a food preparing or cooking area formed by a substantially flat table forming wall 50 may be provided at the rear of the trailer, and substantially flat table forming walls 52 and 54 may be provided on opposite sides of the trailer for serving food and for other purposes. The table forming walls 50, 52 and 54 are hinged along their bottom edges by suitable hinges 55 to stationary support members 56, 58 and 60 which in turn are secured to the framework and the partions defining the compartments 38, 40, 42, 44, 46, etc of the camping trailer. The table forming walls 50, 52 and 54 may extend from the support members 56, 58 and 60 to roof forming wall 62 which is shown as being substantially flat but which if desired may be contoured to embody a ridge line. When in the upper vertical position the walls 50, 52 and 54 close the sides of the compartments, suitable readily operable fasteners 64 being provided to secure the panels 50, 52 and 54 in the position to close the compartments. It will be noted that the upper edges of the panels 50, 52 and 54 lie slightly under the edges of the roof 62 to provide a water tight structure.

Figure 3:
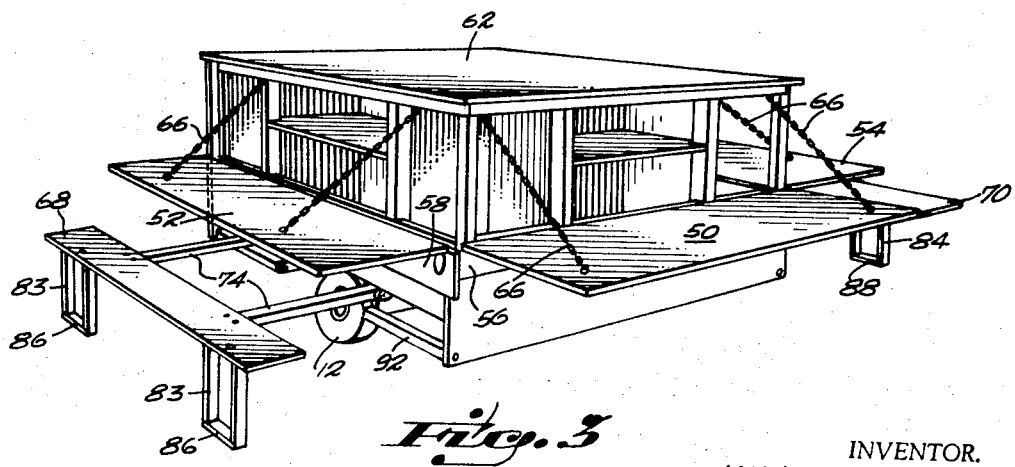
FIG. 3 is a view similar to FIG. 2 showing the tables and benches in the operative positions.
Figure 4:
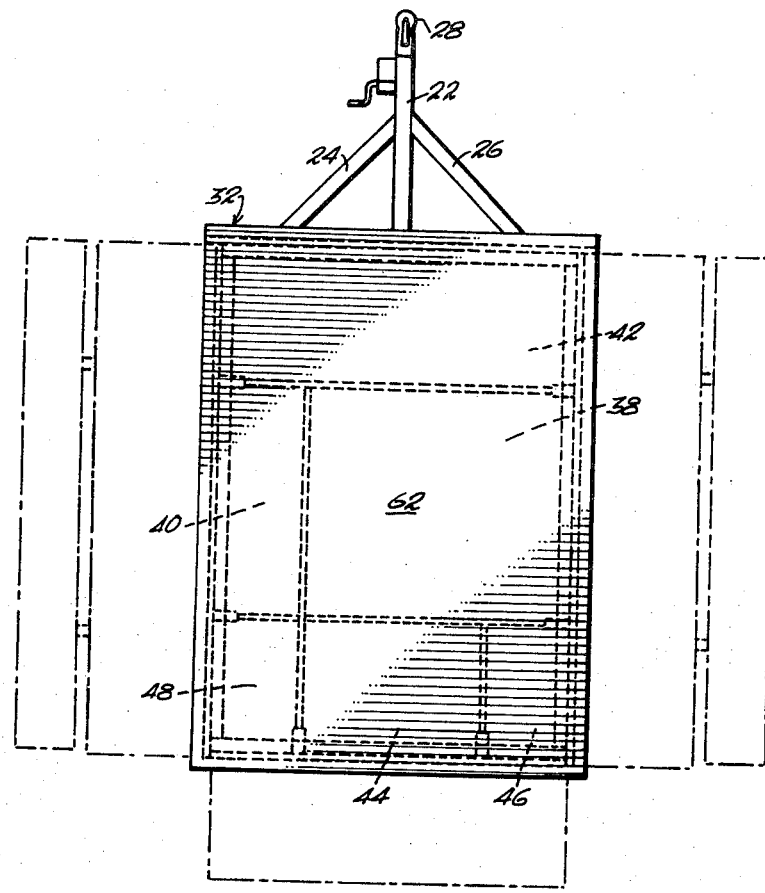
FIG. 4 is a top plan view showing the positions illustrated in FIG. 3.
Figure 5:
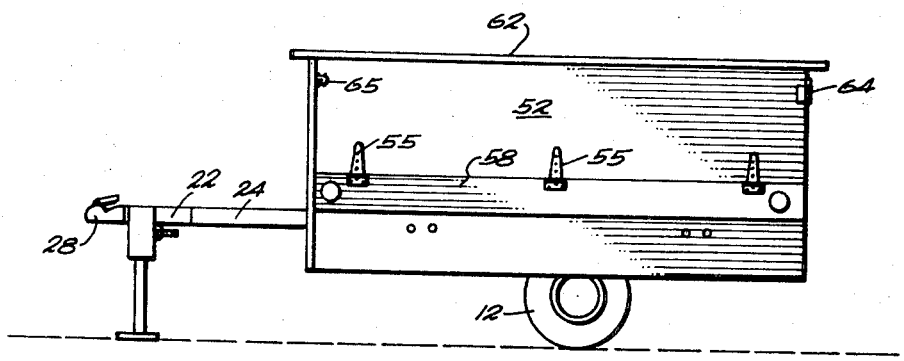
FIG. 5 is a side elevational view showing the picnicking and camping trailer in the closed position.

The table forming walls or panels 50, 52 and 54 may be hinged down to the substantially horizontal position as shown in FIGS. 3, 4 and 6 to permit a person to stand close to the compartments and to facilitate the preparation and serving of food. Any suitable motion limiting mechanism may be employed to hold the tables in the horizontal position, such for example as the chains 66 adapted to engage suitable hooks, or other appropriate restraining devices may be employed.

The table forming walls or panels 50, 52 and 54 may of course be of any convenient widths to provide a table of suitable proportions. I have found that a table width of approximately 20 inches is convenient to provide a table or counter-top structure of desirable proportions. This width also exposes an adequate height of opening of the compartments 38 to 46 to permit convenient loading or unloading of the compartments.

The tables when in the operative horizontal positions may be at any convenient or conventional height above the ground, proportioned to the physical dimensions of the human body, such for example as approximately 28 inches, this dimension making the overall height at the roof 62 approximately 4 feet above the ground.

Readily operable benches 68 and 70 of appropriate height and lateral spacing relative to the tables 52 and 54 as illustrated in FIGS. 3, 4 and 6 may be provided to permit picnickers or campers to sit comfortably at the tables 52 and 54. The benches 68 and 70 have seat portion suitably hinged by hinges 72 to laterally movable slides 74 and 76 having inner guides 78 and 80 respectively slidably mounted on a transverse member 82 secured in the framework of the chassis of the trailer. Attention is directed to the fact that if the camping trailer is narrower than approximately 5½ feet it may be desirable to have separate parallel transverse members 82 to receive guides 78 and 80 on opposite sides of the trailer.

The benches 68 and 70 have ground engaging supports 82 and 84 having extending abutments 86 and 88 to spread the load of the benches 68 and 70 over an extended area on the gorund. The height of the benches above the ground and their widths are proportioned in accordance with the dimensions of the human body to provide conveniently located and comfortable seating.

As shown in FIG. 7 when the bench forming members 68 and 70 are in the vertical or storing position they are vertically disposed and align with the stationary members of support 58 and 60 which extend horizontally somewhat beneath the vertical mid-section of the trailer. Thus as shown at the right hand portions of FIG. 7 the benches 68 and 70 align vertically with the support members 58 and 60 and the table forming walls 58 and 60 to provide a finished or smooth vertical wall along the sides of the camping trailer.

Suitable latches may be employed to lock the benches 68 and 70 in the parked or bench stored positions, and to prevent them from vibrating undesirably. One suitable clamp or latch is illustrated in FIG. 7 wherein a spring pressed plunger 90 engages behind the abutment 92 carried by the chassis or frame of the camping trailer. To release the benches it is only necessary to depress the plunger 90 whereupon the benches 68 and 70 may be withdrawn laterally to release the ground engaging supports 82 and 84 from the slide mechanism on which they travel. When pulled out to the fully extended position the bench members 68 and 70 may be pivoted on the hinged members 72 to move the abutments 86 and 88 in position beneath the benches 68 and 70 to engage the ground to support the benches.

The benches may be of any conventional height such for example as approximately 16 inches above the ground. The benches 68 and 70 may be of any convenient width, such for example 10 inches wide to provide adequate support for parties sitting thereon. The benches 68 and 70 when in the extended operable position may be positioned sufficiently outside of the outer edges of the tables 52 and 54 that a party can easily step over the bench in seating oneself at the table.

My improved picnicking and camping trailer provides inside storage space for all of the paraphernalia and gear that is required for extended camping or other pleasure trips. The trailer is of relatively light weight and can readily be secured to an automobile so that it can be transported anywhere that the vehicle can travel.

When the picnicking or camping site or other destination is reached the rear table forming wall or panel 50 may be released and the table 50 can be moved to the operable position where it can he held in the horizontal position by the chains 66 or other fasteners. Food may be prepared utilizing refrigeration from an ice chest or suitable facilities, and suitable stoves stored preferably with food stuffs in the rear compartments 42, 44 and 46.

The side table forming walls or panels 52 and 54 may then be released, and for example the panels 52 and 54 can be dropped to the lower vertical position to permit ready access to the side compartments so that the camping or other gear to be used may be readily removed and set-up for use.

When it is desired to serve food the table forming walls 52 and 54 may be elevated to the horizontal position and held in place by the chains 66 or other fasteners. The table can then be set, and when the parties are to be seated the benches 68 and 70 may be moved to the operative positions shown in FIGS. 3, 4 and 6. When the meal is over, the benches 68 and 70 may be moved to the stored position to permit easier access to the tables 52 and 54.

Figure 2:
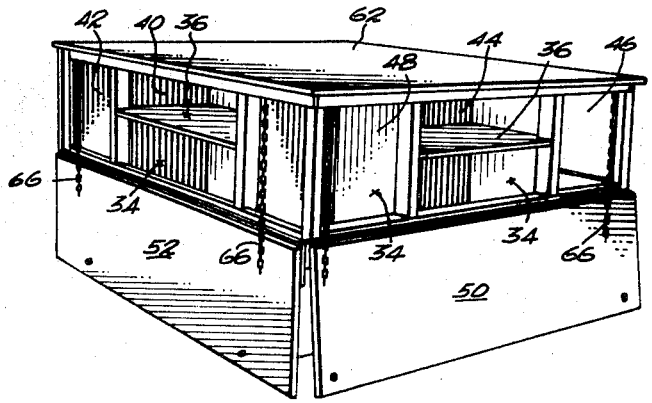
FIG. 2 is a perspective view similar to FIG. 1 showing the picnicking and camping trailer with the side panels pivoted down to a vertical position to facilitate loading and unloading of the individual compartments.

When it is desired to store the gear, the table forming panels 50, 52 and 54 may be lowered to the vertical positions as shown in FIG. 2 to permit easy access to the compartments. When the gear is all loaded the panels 50, 52 and 54 may be hinged to the upper vertical position shown in FIG. 1 and be clamped in place by the latches 64 and 65. The trailer is then in the travel position ready to transport all of the necessary paraphernalia or gear to the next location.

Attention is directed to the fact that my improved table and bench combination may be mounted vertically and horizontally on any wall such for example as on the side of a mobile home, camping trailer or truck.

Also it will be observed that my improved trailer camper provides a low structure which does not interfere with the use of rear view mirrors, and low wind resistance is encountered.

I claim:
1. A picnicking and camping trailer adapted to be detachably secured to a motor vehicle and having,
   A. A body box having substantially horizontal floor and roof walls and providing therebetween a plurality of compartments of varying sizes for the reception of various items of picnicking camping and related paraphernalia,
   B. A substantially flat table forming wall hingedly mounted at its bottom to the sides of the body box and adapted
      a. in an upright position to close the upper portion of said space, and
      b. in a horizontal position to form a table member with said space exposed for access thereto, and
      c. in a downwardly hinged vertical position to expose the upper portion of said space and to permit access thereto while standing adjacent to the side of said body box to facilitate loading or unloading of said space.
2. The invention defined in claim 1 wherein laterally shiftable slides are slidably mounted transversely of the trailer between retracted and extended positions, bench forming members hingedly mounted on outer extremeties of the slides and are movable between,
   a. a position wherein the bench forming members are flush with the lower portion of said space in the body box when the slides are in the retracted position, and
   b. bench forming positions with the bench forming members in the horizontal position with the laterally shiftable slides in the extended positions wherein the bench forming members lie laterally beyond the outer edge of the table forming wall when in the horizontal table forming position.
3. The invention defined in claim 2 wherein latch means are provided to selectively hold the slides in the retracted and extended positions.
4. The invention defined in claim 2 wherein a plurality of partitions divide the space within the body box into a plurality of separate compartments of suitable sizes for the reception of various classes of items to be stored and carried.
5. The invention defined in claim 2 wherein the trailer has two spaced wheels, and resilient support means between the wheels and the trailer.
6. The invention defined in claim 2 wherein the upper surfaces of the trailer is substantially flat to provide a load carrying and working surface.
7. The invention defined in claim 2 wherein the body box has a substantially flat rear surface, and a substantially flat table forming wall is hingedly mounted at its bottom to the lower portion of the rear surface of the body box to provide a food preparing table.
8. The invention defined in claim 2 wherein the camping trailer presents a low structure which does not interfere with the use of rear view mirrors in the motor vehicle.
9. A picnicking and camping trailer adapted to be detachably secured to a motor vehicle and having,
   A. an enclosed body section defining a compartmentized area for the purpose of the reception of various picnicking and camping paraphernalia,
   B. an upper side wall of the enclosed body section being hinged horizontally to the body section and adapted to hinge downwardly to a horizontal position to provide a table surface,

C. the side wall of the enclosed body section beneath the hinged upper side wall of the body section being movable laterally relative to the hinged side wall and movable between a retracted position adjacent the body and an extended operative position to provide a ground supported seat in operative relation to the upper side wall of the body section when in the horizontal table forming position.

* * * * *